Jan. 8, 1935.  O. M. GROSS  1,987,147
INSULATION UNIT
Filed Jan. 16, 1934    2 Sheets-Sheet 2
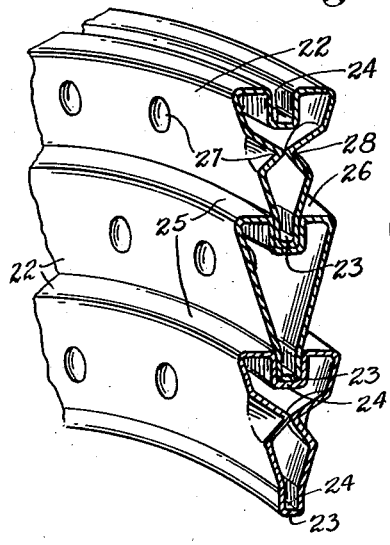
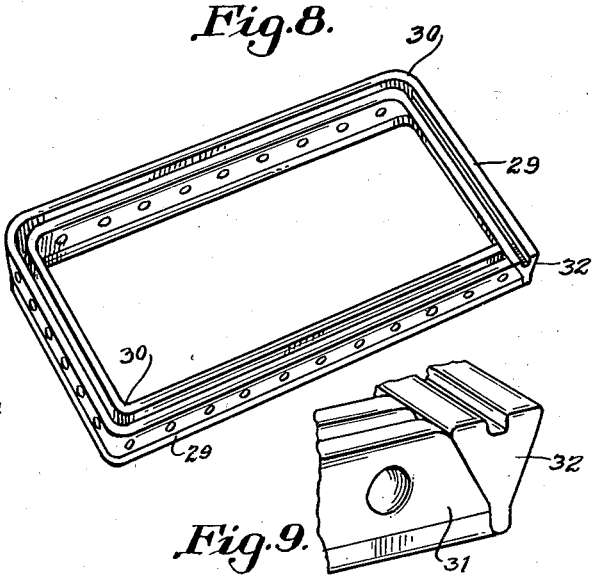
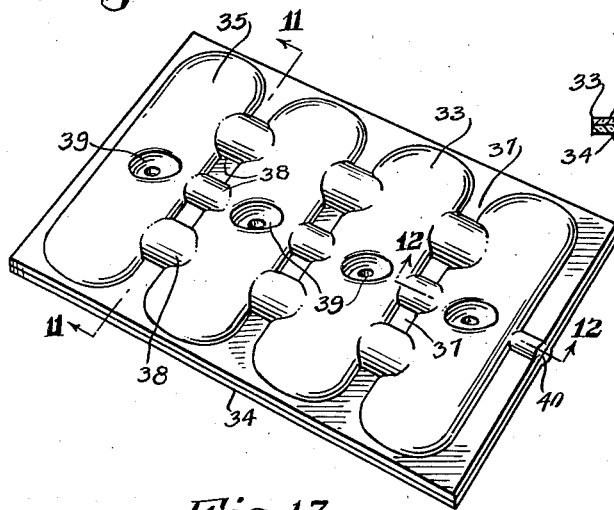
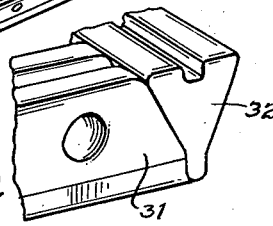
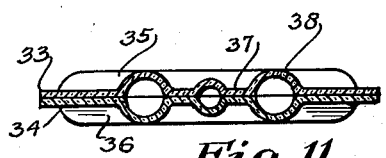
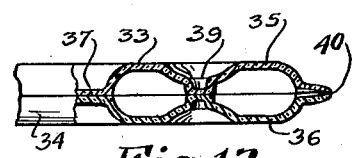
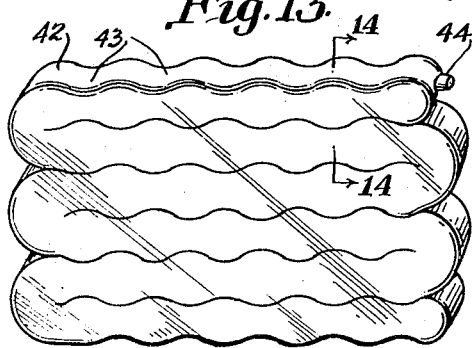
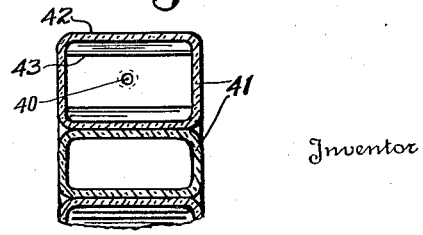
Inventor
O. M. GROSS
By Mason Fenwick & Lawrence
Attorneys Patented Jan. 8, 1935

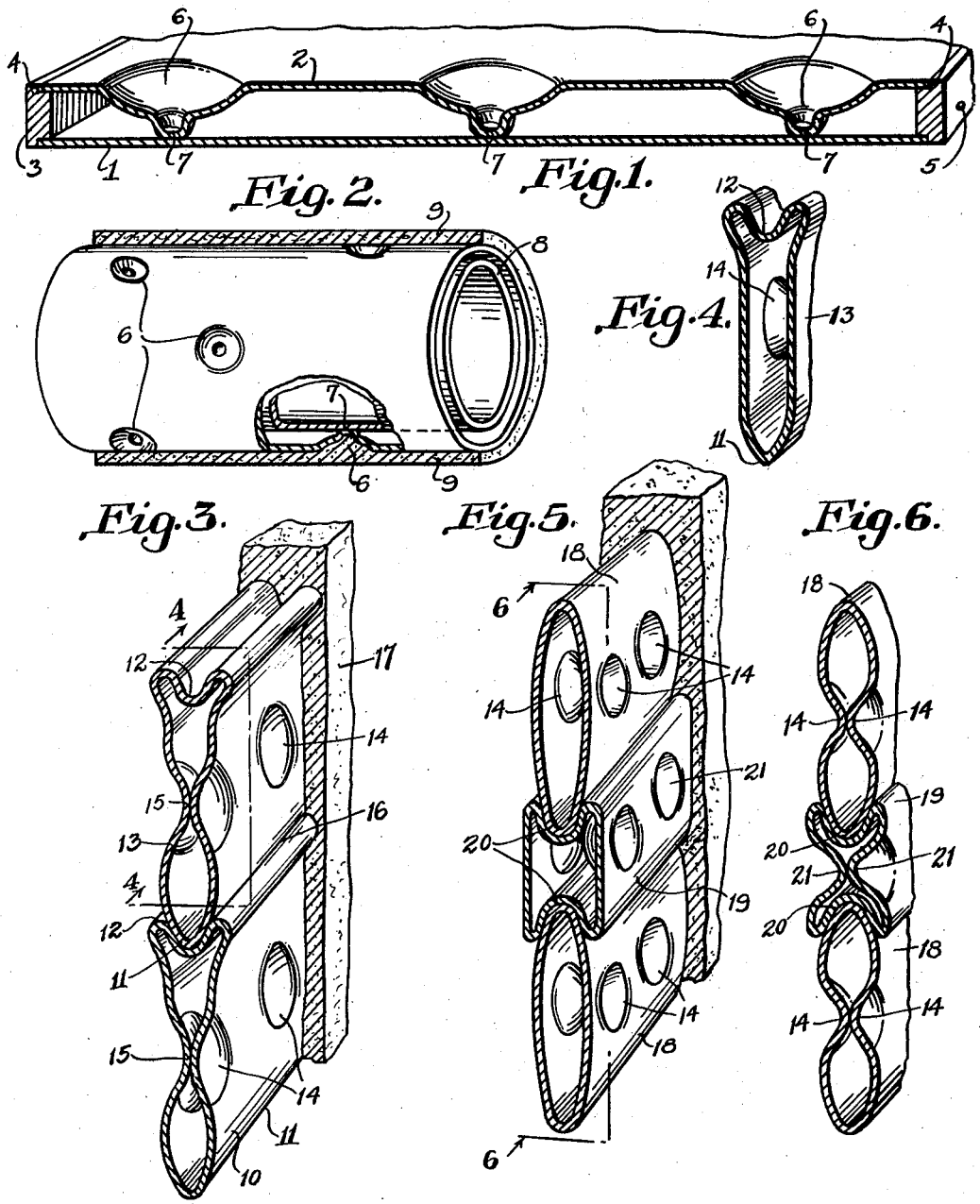

1,987,147

UNITED STATES PATENT OFFICE 1,987,147

INSULATION UNIT

Oswald M. Gross, Detroit, Mich.

Application January 16, 1934, Serial No. 706,872

11 Claims. (Cl. 72—0.5)

This invention relates to thermal insulation structure and particularly to that type of heat barrier which utilizes evacuated space primarily as the insulating medium.

One of the objects of the invention is to provide an insulation unit embodying the vacuum principle and which can be employed in the fabrication of refrigerators, cold storage rooms, as the lagging for furnaces, boilers, etc., and in the walls of buildings generally, for purpose of heat conservation.

Another object of the invention is the provision of an insulation unit of the type described adapted to form the core or reinforcement for the walls of buildings, etc., and to serve as a plaster base.

Insulation units having an evacuated chamber are necessarily limited to a narrow variety of materials since very few substances are impervious to air, those materials which readily suggest themselves being metal and glass. The former having a relative high co-efficient of thermal expansion and being through the nature of its use more highly heated on one side than the other, requires that consideration be given to the prevention of strains and warping due to unequal expansion. Glass insulation is limited to units of relative small size on account of the inevitable strain which is set up in glass upon cooling.

The invention therefore has as some of its specific objects the provision in the metal unit of means for permitting freedom of movement between the inner and outer walls of the evacuated chamber and in the glass unit the dimensioning of the units so that they can be properly annealed and thus rendered immune to spontaneous fracture.

Another object of the invention is the provision of means to prevent collapse of the units whether metal or glass through atmospheric pressure.

Other objects of the invention will appear as the following description of a number of illustrative embodiments of the invention proceeds.

Referring now to the drawings which illustrate the several forms of the invention included in the specification, and throughout the several figures of which the same characters of reference have been employed to designate identical parts:

Figure 1 is a cross section through a metallic insulation unit;

Figure 2 is a perspective view showing the same type of unit applied in cylindrical form in the construction of a boiler or conduit;

Figure 3 is a perspective view partly in section showing another form of the invention in which the metallic insulation unit is built into a wall;

Figure 4 is a vertical section taken along the line 4—4 of Figure 3;

Figure 5 is a perspective view partly in section showing another modified form of insulation unit built into a wall and forming a plaster base;

Figure 6 is a section taken along the line 6—6 of Figure 5;

Figure 7 is a perspective view partly in section showing a round wall fabricated from a modified insulation unit;

Figure 8 is a perspective view of the same form of the invention as shown in Figure 7, but adapted to be applied to a rectangular construction;

Figure 9 is a perspective view showing a corner of the insulation unit illustrated in Figure 8;

Figure 10 is a perspective view of a glass unit;

Figure 11 is a section taken along the line 11—11 of Figure 10;

Figure 12 is a section taken along the line 12—12 of Figure 10;

Figure 13 is a perspective view of a further modified form of the invention; and Figure 14 is a section taken along the line 14—14 of Figure 12.

Referring now to that form of the invention shown in Figure 1, the numerals 1 and 2 represent flat metallic sheets maintained in spaced relation on all four sides by a metallic frame 3, preferably rabbeted as shown to receive the edges of the sheets 1 and 2, which are welded thereto as indicated at 4. Thus a rectangular chamber is hermetically enclosed between said sheets adapted to be evacuated as through the nipple 5 which is sealed to retain the vacuum.

It is obvious that such a unit made of any considerable size must be reinforced to prevent collapse. To this intent one of the sheets, for example, the sheet 2 is provided with a plurality of inwardly pressed areas 6, preferably circular, forming tits 7 which freely engage the inner side of the opposite sheet 1. It is obvious that in functioning as a heat barrier, the insulation unit so constructed will be hotter on one side than on the other so that there will be elongation of the sheet 1 relative to the sheet 2, or vice versa, which if the tits 7 were fixed with respect to the sheet 1 would cause warping and eventual rending of the material at the points of contact. Since the tits are free with respect to the wall 1, unequal expansion and contraction merely produces slight sliding movement between the tits and the sheet which they engage preventing the development of strains in the insulation unit. The tits 7 are preferably made rotund so as to present substantially a point contact to the sheet 1. This not only reduces such frictional pressure as may be engendered by the differential expansion of the two sheets, but also minimizes thermal conductivity between the inner and outer sheets.

The same structural unit illustrated in Figure 1 may be made in cylindrical or in other curved forms as shown in Figure 2 in which it constitutes the wall of a boiler or conduit. In the event that pressure is developed within the shell 8 of said boiler or conduit, the tits 7 perform an additional function in reinforcing the shell against rupture through excessive internal pressure. It will be observed from Figure 2 that the inwardly pressed areas 6 function as keys for any cementitious lagging 9, such as that indicated by the reference numeral 8 with which it may be desired to coat the outside of the conduit or boiler.

Figures 3 to 6 disclose another modification of the invention in which insulation units 10 of any desirable length are formed as a continuous tube with a tongue-shaped lower end 11 and the channelled upper end 12 adapted to receive the tongue-shaped lower end of an adjacent unit 13. In its intermediate portion the unit 10 is provided with a longitudinal series of depressions 14 preferably equally indented from both sides and meeting at the point 15. These depressions serve to reinforce the sides of the unit against collapse.

The joint between the tongue-shaped lower end 11 and the channelled upper end 12 forms an elongated heat leakage path and thus minimizes direct heat interchange through the metallic parts of the unit. The depressions 14 reinforce the unit against collapse and function, as do the valleys 16 which are formed at the juncture of the meeting edges of adjacent units, as keys for retaining a plaster coat 17, which can be applied directly to the insulation units without the intermediary of lathing.

Figures 5 and 6 show a modified form of wall fabricated from insulation units 18 of oval tubular form having a longitudinal series of depressions 14 pressed in from opposite sides and contacting as illustrated in Figure 6, their function being the same as the similar depressions shown in Figure 3. The units 18 are arranged in alternate relation to intermediate units 19 provided with upper and lower channels 20 receiving the adjacent edges of the upper and lower units. Both units 18 and 20 define chambers from which the air has been suitably evacuated and the chambers being then sealed. The intermediate unit 19 is provided with a series of inwardly directed bosses 21 freely contacting.

Figures 7, 8 and 9 show another modification of the invention in which the insulation unit is a tubular member 22 of substantially triangular cross section. As shown, it is assembled with its apex 23 directed downwardly. Each unit has a channel 24 in its base receiving the apex 23 of the superposed unit. The fabricated wall such as is illustrated in Figure 7 may be composed of a plurality of the tubular members 22, or a single tubular member may be used with the same effect by winding it spirally. The base portions 25 and 26 at the sides of the channel 24 form ledges in the wall which may function as plaster keys or to hold in place any lagging or other insulation material which may be used in connection with the evacuated tubes 22. In order to prevent collapse the tubular members 22 are provided with longitudinal series of indents 27 and 28 freely contacting at their apices. As shown, the indents of the several tiers are preferably staggered. The apices 23 as well as the walls of the channels in which they seat in effect constitute reinforcing ribs which assists in maintaining the integrity of the units against external pressure. The joint between the apices 23 and the walls of the channels 24 forms an elongated metallic heat leakage path.

Figure 7 shows a construction in which the tubular units 22 are of curved contour. Figure 8 shows the same type of unit, but arranged so as to form a rectangular construction. That shown in Figure 7 is particularly adapted for round refrigerators while the form shown in Figures 8 and 9 are particularly designed for rectangular refrigerators. The unit shown in Figure 8 comprises an evacuated tubular member 29 of triangular cross section bent at certain of the corners as indicated by the reference character 30 and coming together in close relation at its terminal corners as indicated in an enlarged degree in Figure 8. It will be observed that the end 21 of the insulation unit is terminated in such a manner as to conform to the shape of the side of the adjacent free end 32 of said unit making a close joint. It is to be understood that both of the free ends of the unit are hermetically closed.

Figures 10, 11 and 12 show an exemplary form of insulation unit preferably employing glass as the construction material. This is necessarily a molded shape, preferably made in two sections 33 and 34 as indicated in Figure 11 and being formed with convex upper and lower panels 35 and 36 separated by reinforcing ribs 37 and said ribs having conduits establishing communication between the panels which conduits are formed in convex enlargements 38 connecting adjacent convex panels. The convex nature of the panels and the walls of the enlargements 38 practically assures the insulation unit against collapse from external pressure, but in the event that the convex panels are of great size they are preferably provided with re-entrant bosses 39 engaging the opposite wall of the unit as shown in Figure 12. The upper and lower halves of the unit are preferably separately cast then placed together as shown in Figure 11 and hermetically sealed, as by fusing. The reference character 40 in Figure 10 indicates the aperture through which the space within the insulation unit was evacuated and which aperture is afterward sealed.

Figure 13 illustrates still another form of insulation unit which may be of glass or metal. It has the form of a hollow continuous tube 41 preferably of rectangular cross section and formed with undulations comprising the hills 42 and the valleys 43. The tube 41 is folded upon itself as shown, the undulating surface of one tier fitting into the adjacent undulating surface of the next adjacent tier as shown. The unit may be made of any desired length and height. A single connection 44 may suffice for withdrawing air from the entire unit which connection is sealed. This unit may be built into a wall in the same manner as bricks with staggered joints, the undulating surface at the top and bottom of the unit and at the two ends serving advantageously as a mortar bed.

The hills and valleys in the surface of the tube serve the same purpose as the indents in the other forms of the invention in reinforcing the walls of the tube against collapse, it being of course well known that a wall which is perpendicular to the direction of a stress has much less tensile resistance than a wall which is inclined with respect to the direction of such stress.

It will be obvious from the description of the several modifications of the invention herein disclosed that the inventive principle in its broadest concept is concerned with the provision of evacuated insulation units having means to avert the collapse of the unit and that the inventive principle can be exemplified specifically in many forms of structure, of which those herein disclosed are merely examples.

What I claim is:

1. Insulation unit comprising means forming a cell having spaced walls enclosing an evacuated chamber, said cell adapted to be arranged in fabricated relation to other similar cells in the formation of an insulating wall, each cell being formed along one edge as a tongue and along the other edge as a groove, the tongue of one cell being received in the groove of an adjacent cell, and the joint thus formed between adjacent cells constituting a ledge adapted to function as a key for plaster applied to the wall so fabricated.

2. Insulation unit comprising an elongated tubular member enclosing an evacuated space and of general triangular cross section, the base portion of said tubular member being provided with a channel for receiving the apex portion of an adjacent similar tubular member.

3. Insulation unit comprising a tubular member of substantially triangular cross section arranged in the form of a rectangle with its free edges contacting, said member having a channel in its base side adapted to receive the apex of a similar superposed member, and said member being provided on at least one side between its apex and base with a longitudinal series of re-entrant portions freely contacting the opposite side of said member.

4. Insulation unit comprising a cell of refractory impervious substance comprising two cast halves integrally united and enclosing an evacuated space, the opposite walls of said cell being formed as outwardly convexed panels to resist collapse.

5. Insulation unit comprising a cell of refractory impervious substance comprising two case halves integrally united and enclosing an evacuated space, the opposite walls of said cell being formed as outwardly convexed panels to resist collapse, said cell being provided with reinforcing ribs between said panels and with passages in said ribs maintaining communication between the several parts of said enclosed chamber defined by said ribs.

6. Insulation unit comprising a tubular member of substantially rectangular cross section folded back and forth upon itself in superposed convolutions, the adjacent faces of said convolutions being in close contact, said tubular member enclosing an evacuated chamber.

7. Insulation unit as claimed in claim 5, the upper and lower surfaces of said convolutions being undulating and the undulations of one convolution interfitting with the undulations of the adjacent convolution.

8. Insulation unit comprising means forming a cell having spaced walls enclosing an evacuated chamber, said cell being adapted to be arranged in fabricated relation to other similar cells in the formation of an insulating wall, said cells being formed as a tongue along one edge and as a groove along the opposite edge, the tongue of one cell fitting into the groove of an adjacent cell, at least one of the side walls of said cells being formed with re-entrant portions freely touching the opposite wall within the chamber of said cell.

9. Insulation unit comprising means forming a cell having spaced walls enclosing an evacuated chamber, said cell being adapted to be arranged in fabricated relation to other similar cells in the formation of an insulating wall, said cells being formed as a tongue along one edge and as a groove along the opposite edge, the tongue of one cell fitting into the groove of an adjacent cell, said cells being formed with re-entrant reinforcing portions extending within said chamber and freely contacting.

10. Insulating wall comprising tubular cells including walls enclosing an evacuated chamber, the opposite edges of said cells being formed as tongues, and an intermediate tubular member including walls enclosing an evacuated chamber, the opposite edges of said last mentioned tubular member being formed as grooves receiving the tongues of adjacent underlying and overlying cells, the joints between said tubular members constituting keyways adapted to interlock with a layer of plaster applied to said wall.

11. Insulating wall comprising tubular cells including walls enclosing an evacuated chamber, the opposite edges of said cells being formed as tongues, and an intermediate tubular member including walls enclosing an evacuated chamber, the opposite edges of said last mentioned tubular member being formed as grooves receiving the tongues of adjacent underlying and overlying cells, said tubular members being provided with series of inwardly extending bosses engaging the opposite walls of said units to resist collapse.

OSWALD M. GROSS.